United States Patent
Lee et al.

(10) Patent No.: US 9,835,245 B2
(45) Date of Patent: Dec. 5, 2017

(54) VEHICULAR TRANSMISSION RANGE SWITCHING DEVICE

(71) Applicant: DAESUNG ELECTRIC CO., LTD, Gyeonggi-do (KR)

(72) Inventors: Seag Woo Lee, Gyeonggi-do (KR); Min Seok Jeon, Gyeonggi-do (KR); Won Lee, Gyeonggi-do (KR)

(73) Assignee: Daesung Electric Co., Ltd. (KR)

( * ) Notice: Subject to any disclaimer, the term of this patent is extended or adjusted under 35 U.S.C. 154(b) by 35 days.

(21) Appl. No.: 14/764,992

(22) PCT Filed: Mar. 18, 2013

(86) PCT No.: PCT/KR2013/002163
§ 371 (c)(1),
(2) Date: Jul. 31, 2015

(87) PCT Pub. No.: WO2014/142377
PCT Pub. Date: Sep. 18, 2014

(65) Prior Publication Data
US 2015/0369358 A1    Dec. 24, 2015

(30) Foreign Application Priority Data

Mar. 14, 2013    (KR) ........................ 10-2013-0027165

(51) Int. Cl.
*G05G 5/05*    (2006.01)
*F16H 59/08*    (2006.01)
(Continued)

(52) U.S. Cl.
CPC ............. *F16H 59/08* (2013.01); *F16H 61/24* (2013.01); *G05G 5/05* (2013.01); *G05G 9/02* (2013.01);
(Continued)

(58) Field of Classification Search
CPC .... F16H 59/08; F16H 61/24; F16H 2059/081; G05G 5/05
See application file for complete search history.

(56) References Cited

U.S. PATENT DOCUMENTS 7,834,865 B2 * 11/2010 Jannasch .................. G05G 1/10
200/564
2003/0029261 A1    2/2003 DeJonge
(Continued)

FOREIGN PATENT DOCUMENTS

| CN | 101646883 A | 2/2010 |
| JP | 04-092151 A | 3/1992 |

(Continued)

OTHER PUBLICATIONS

International Search Report for PCT/KR2013/002163, dated Jul. 18, 2013, pp. 1-4.

*Primary Examiner* — Vicky A Johnson
(74) *Attorney, Agent, or Firm* — Tarolli, Sundheim, Covell & Tummino LLP (57) ABSTRACT

A vehicular transmission range switching device is provided which: a cover part with one side containing a display part for displaying the transmission range, a knob handling part inserted in the cover part so as to be arranged in a side of the display part, a rotary unit consisting of a shaft inserted in the lower side of the knob handling part, a moving block inserted in the upper side of the shaft, and a stopper inserted in the lower side of the shaft, that rotates along with the knob handling part, a gear part connected to the lower part of the rotary unit for turning the rotary unit to the parking range when shutting the vehicle off, a body part consisting of a locking part for limiting the turning of the rotary unit, and a sensing part for sensing the turning of the rotary unit and the gear part.

16 Claims, 10 Drawing Sheets

(51) Int. Cl.
*F16H 61/24* (2006.01)
*G05G 9/02* (2006.01)

(52) U.S. Cl.
CPC .. *F16H 2059/081* (2013.01); *F16H 2061/241* (2013.01); *Y10T 74/20492* (2015.01)

(56) References Cited

U.S. PATENT DOCUMENTS

| | | | | |
|---|---|---|---|---|
| 2006/0037424 | A1* | 2/2006 | Pickering | B60K 37/06 |
| | | | | 74/473.3 |
| 2007/0261509 | A1 | 11/2007 | Meyer et al. | |
| 2015/0285351 | A1* | 10/2015 | Rake | G05G 1/08 |
| | | | | 74/436 |
| 2015/0369357 | A1* | 12/2015 | Lee | F16H 59/08 |
| | | | | 74/504 |

FOREIGN PATENT DOCUMENTS

| | | |
|---|---|---|
| JP | 2000-062491 A | 2/2000 |
| JP | 2001277892 A | 10/2001 |
| JP | 2001334836 A | 12/2001 |
| JP | 2002-283868 A | 10/2002 |
| JP | 2004-087307 A | 3/2004 |
| JP | 2004324849 A | 11/2004 |
| JP | 2009-107559 A | 5/2009 |
| JP | 2010-535659 A | 11/2010 |
| JP | 2012-066639 A | 4/2012 |
| JP | 2012-153315 A | 8/2012 |
| KR | 20100044832 A | 4/2010 |
| KR | 10-2010-0083981 A | 7/2010 |
| KR | 20100083982 A | 7/2010 |
| KR | 101158612 B1 | 6/2012 |
| WO | 2006/050702 A1 | 5/2006 |
| WO | 2012/064899 A1 | 5/2012 |

\* cited by examiner

VEHICULAR TRANSMISSION RANGE SWITCHING DEVICE

RELATED APPLICATIONS

The present invention is a U.S. National Stage under 35 USC 371 patent application, claiming priority to Ser. No. PCT/KR2013/002163, filed on 18 Mar. 2013; which claims priority from KR10-2013-0027165, filed 14 Mar. 2013, the entirety of both of which are incorporated herein by reference.

TECHNICAL FIELD

The present invention relates to a shift range switching device for a vehicle, and more particularly, to a shift range switching device for a vehicle, which allows a transmission to be shifted to a parking range when ignition of a vehicle is turned off, irrespective of a set shift range.

BACKGROUND ART

A vehicle such as a car has various functions capable of providing a more stable and comfortable traveling state for a user in addition to a function as a moving means. An engine and a transmission as core driving components of the vehicle have been developed to be electronically controlled, and further a variety of components of the vehicle were digitized or have been developed to be digitized.

Meanwhile, a vehicle equipped with an automatic transmission is rapidly increased for smoothly and easily traveling under heavy traffic conditions in downtown. When a driver sets a desired shift range using a shift lever, the shift range set by the driver is transferred to a TCU (Transmission Control Unit) for performing control of the transmission and various control units, so that the control units control supply and cut-off of power when the vehicle is started and electrically control setting and releasing of another shift range and a reverse shift range in the shift range set during traveling of the vehicle.

Since the automatic transmission is automatically shifted to a parking range in a vehicle system when ignition of the vehicle is turned off in a state of a shift range (for instance, a drive range, a reverse range, or a neutral range) other than the parking range, a shift range switch for a vehicle may be positioned at a different position from that of the shift range in the related art. For this reason, the vehicle may move abruptly when the vehicle is restarted after the ignition thereof is turned off in a shift range other than the parking range.

Such a shift range switch for a vehicle is disclosed in Korean Patent No. 10-1158612 and U.S. Patent Laid-Open Publication No. 20070261509.

DISCLOSURE

Technical Problem

Accordingly, the present invention has been made in view of the above-mentioned problem, and an object thereof is to provide a shift range switching device for a vehicle, capable of allowing the switching device to be moved to a parking position when ignition of a vehicle is turned off and a transmission is automatically shifted to a parking range.

In addition, another object of the present invention is to provide a shift range switching device for a vehicle, capable of preventing a vehicle from moving abruptly when the vehicle is restarted after ignition thereof is turned off in a shift range other than a parking range.

Technical Solution

In accordance with an aspect of the present invention, a shift range switching device for a vehicle includes a cover part configured such that a display part for displaying a working range of a transmission is inserted in one side of the cover part, a knob operation part inserted in the cover part so as to be arranged on a side of the display part, a rotary unit including a shaft inserted in a lower end of the knob operation part, a moving block inserted in an upper side of the shaft, and a stopper inserted in a lower side of the shaft, the rotary unit rotating along with the knob operation part, a gear part coupled to a lower portion of the rotary unit to rotate the rotary unit to a parking range when ignition of a vehicle is turned off, and a body part including a locking part coupled to the rotary unit to restrict rotation of the rotary unit, a sensing part for sensing rotation of the rotary unit and the gear part, and a body receiving the locking part and the sensing part.

The rotary unit may include a cam fitted on an outer side of the shaft, a first elastic member inserted in a lower end of the shaft, a slide pin inserted in the shaft so as to penetrate the shaft in a direction perpendicular to the axial direction thereof, and a sensing gear engaged to an upper end of the moving block. The cam may be arranged so as to surround a portion of the stopper and the slide pin.

The slide pin may have a second elastic member coupled between both ends thereof, and the second elastic member may provide elastic force to the both ends of the slide pin. The both ends of the slide pin may come into frictional contact with an inner peripheral surface of the cam and a detent groove may be formed on the inner peripheral surface of the cam, so that the slide pin is caught by the detent groove by the elastic force of the second elastic member.

The shaft may include a key formed on an outer peripheral surface thereof to be inserted in the moving block, and a through-hole formed beneath the key in the direction perpendicular to the axial direction. The slide pin may be inserted in the through-hole.

The stopper may have grooves formed in a two-stage manner on an upper end thereof so that the slide pin is caught by the grooves. The grooves of the stopper formed in the two-stage manner may extend in different directions from a center at which the grooves are vertically interconnected, the slide pin may be positioned at an upper groove of the grooves when the transmission is shifted to a P, R, N, or D range, and the slide pin may be positioned at a lower groove of the grooves when the transmission is shifted to an S range.

The sensing gear may have gear teeth which are formed on an upper end thereof and are engaged with the moving block, and a first magnetic substance coupled to a lower end thereof. The body part may include a first sensor arranged in the vicinity of the first magnetic substance to sense rotation of the sensing gear.

The gear part may include a first gear engaged to a lower end of the stopper, a second gear engaged with the first gear, and a motor engaged to the second gear through a worm gear. The gear part may include a second magnetic substance coupled to a lower portion of the second gear, and the body part may include a second sensor arranged in the vicinity of the second magnetic substance to sense rotation of the second gear.

The body part may include a middle cover coupled between the body part and the cover part in an upper portion of the body part, and the middle cover may have a seating part in which the knob operation part is inserted. The middle cover may further include an outlet port formed at one side of the seating part so as to be inclined outwardly and downwardly from the inside of the seating part.

The locking part may include a stationary block having a groove part coupled to a lower end of the moving block, a solenoid coupled to one side of the stationary block so as to move the stationary block in a forward or backward direction, and a guide block arranged so as to support a side of the stationary block. The moving block may have a protrusion part formed on the lower end thereof to be inserted in the groove part of the stationary block.

Advantageous Effects

In accordance with the present invention, it may be possible to rotatably move a switching device to a parking position through a gear part connected to a rotary unit when ignition of a vehicle is turned off and a transmission is automatically shifted to a parking range.

In addition, since the switching device is moved to the parking position when ignition of the vehicle is turned off, it may be possible to prevent the vehicle from moving abruptly when the vehicle is restarted after the ignition thereof is turned off in a shift range other than the parking range.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Reference will now be made in detail to embodiments of the present invention, examples of which are illustrated in the accompanying drawings. In the drawings, the thickness or size of each line is exaggerated, omitted, or schematically illustrated for convenience of description and clarity. In addition, terms used herein are terms defined in consideration of functionality of the present invention, and it may be variable depending on the intention or practice of a user or an operator. Therefore, such terms should be determined based on the entire content disclosed herein.

Figure 1:
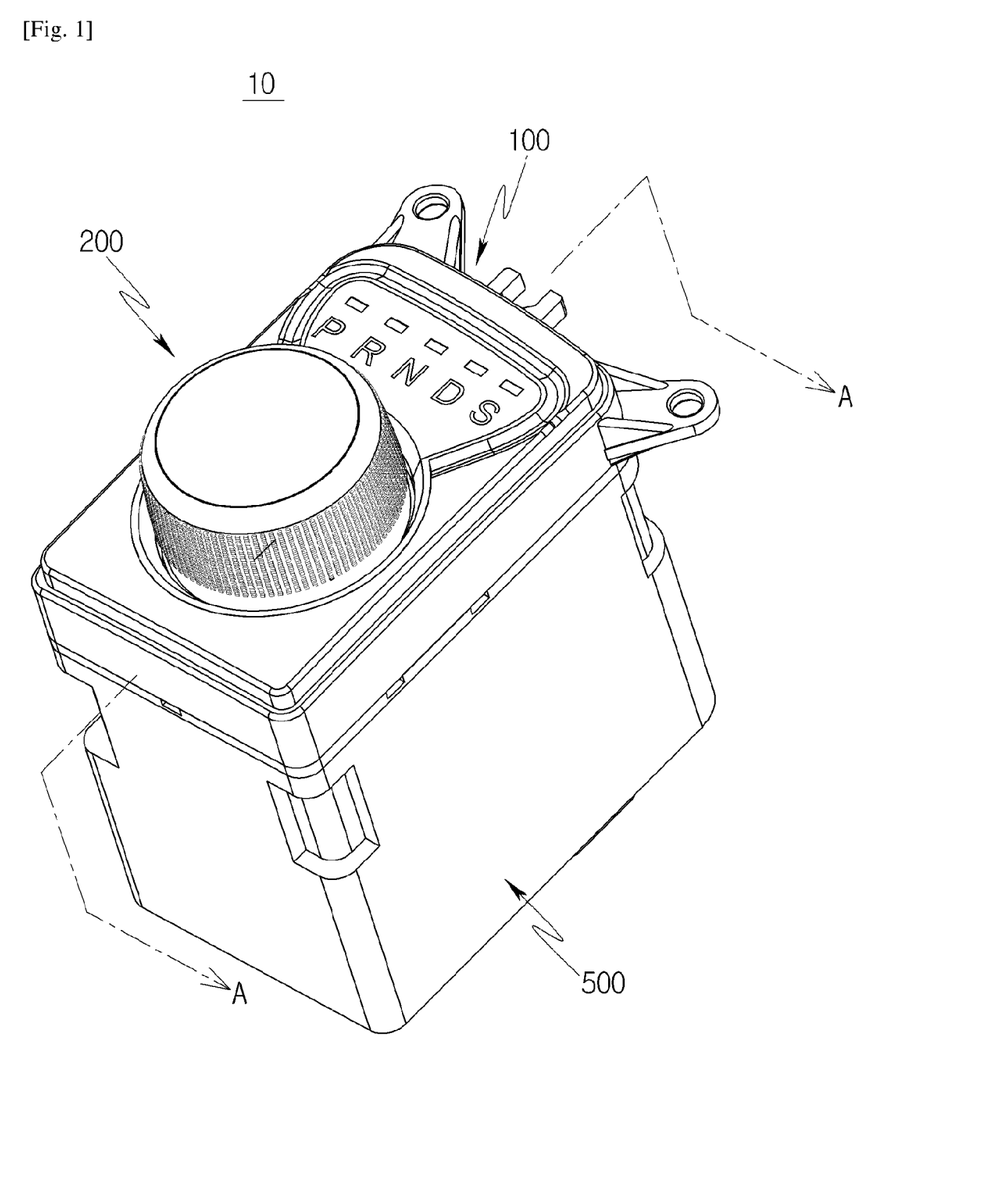
FIG. 1 is a perspective view illustrating a shift range switching device for a vehicle according to an embodiment of the present invention.
Figure 2:
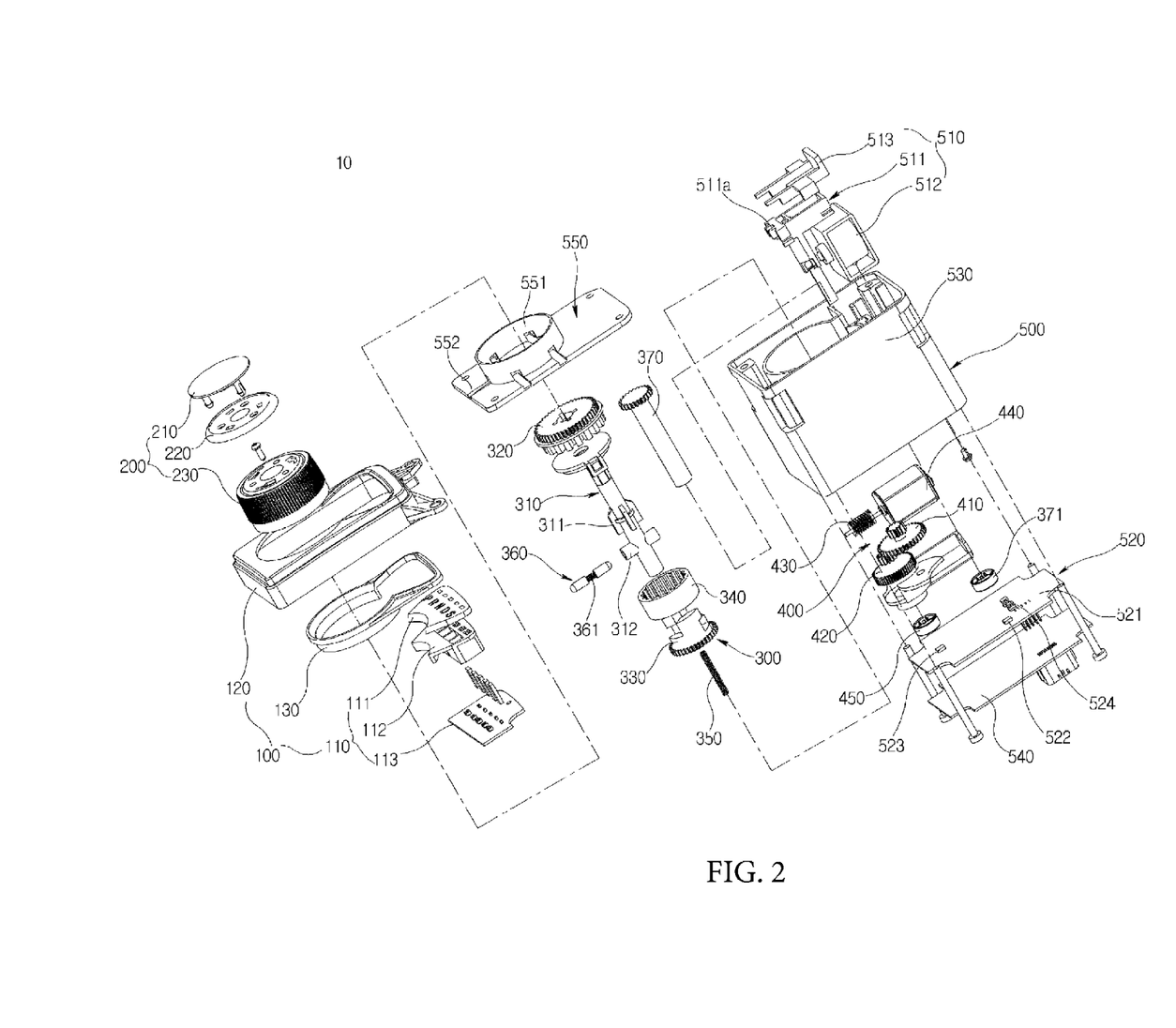
FIG. 2 is an exploded perspective view illustrating the shift range switching device for a vehicle of FIG. 1.
Figure 3:
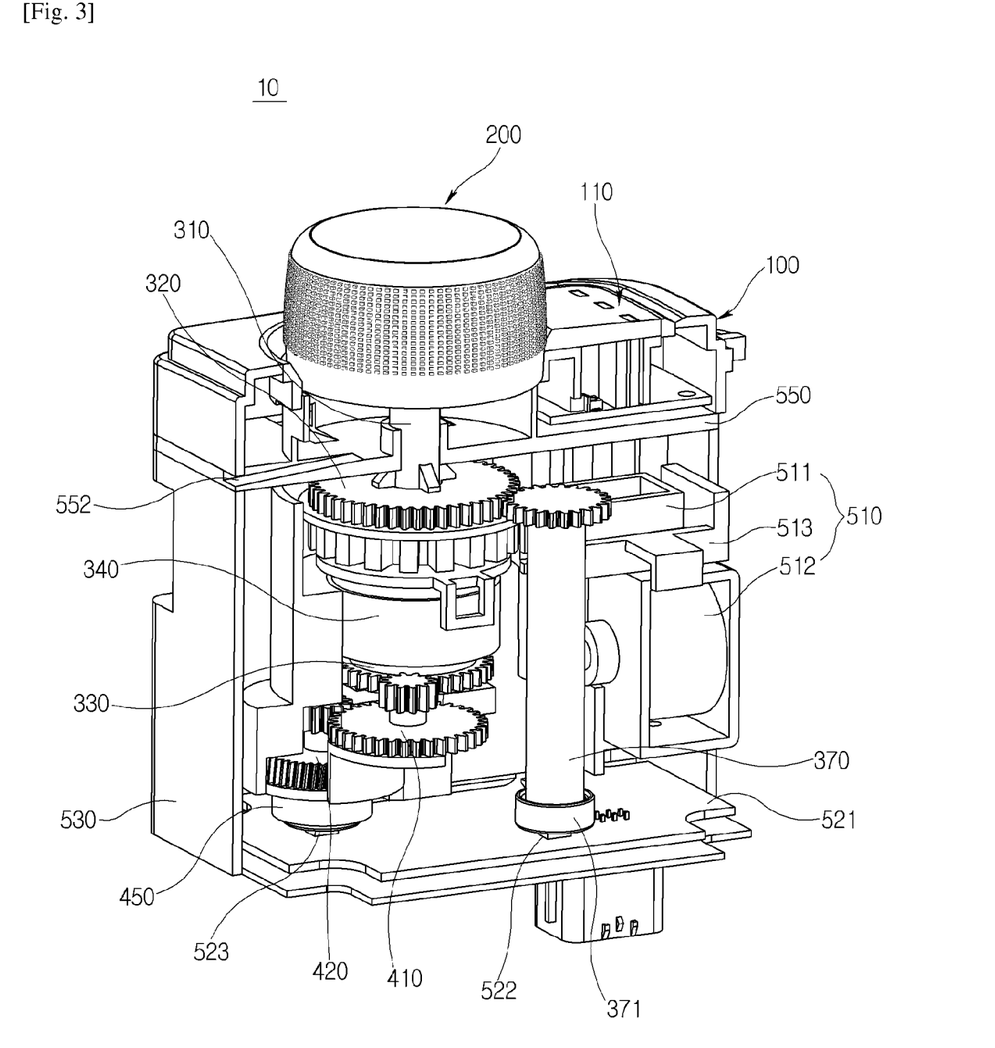
FIG. 3 is a cross-sectional perspective view taken along line "A-A" in the shift range switching device for a vehicle of FIG. 1.
Figure 4:
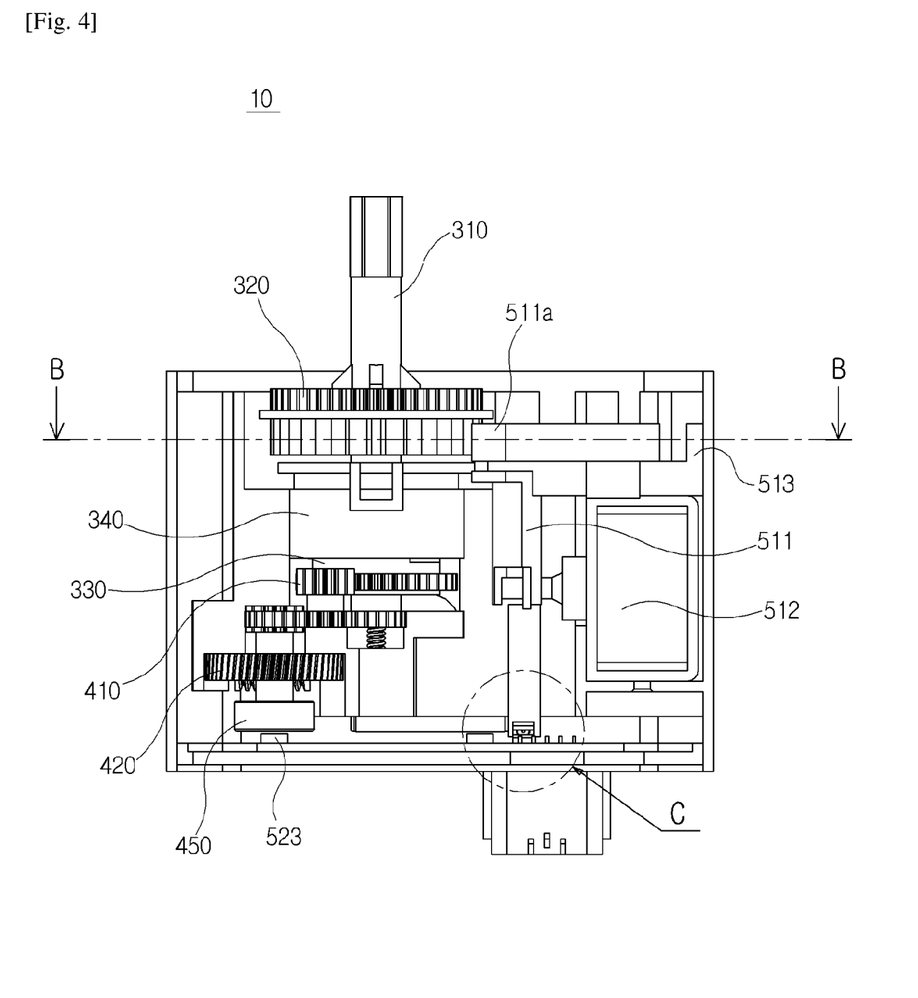
FIG. 4 is a cross-sectional view taken along line "A-A" in the shift range switching device for a vehicle of FIG. 1.

FIG. 1 is a perspective view illustrating a shift range switching device for a vehicle according to an embodiment of the present invention. FIG. 2 is an exploded perspective view illustrating the shift range switching device for a vehicle of FIG. 1. FIG. 3 is a cross-sectional perspective view taken along line "A-A" in the shift range switching device for a vehicle of FIG. 1. FIG. 4 is a cross-sectional view taken along line "A-A" in the shift range switching device for a vehicle of FIG. 1.

Referring to FIGS. 1 to 4, a shift range switching device for a vehicle 10 according to an embodiment of the present invention includes a cover part 100, a knob operation part 200, a rotary unit 300, a gear part 400, and a body part 500. The shift range switching device for a vehicle 10 may adjust a shift range of a transmission in such a manner that a driver turns the knob operation part 200.

In the shift range switching device for a vehicle 10, a display part 110 for displaying a working range of the transmission is inserted in one side of the cover part 100, the knob operation part 200 inserted in the cover part 100 is arranged on a side of the display part 110, the rotary unit 300 is coupled to a lower end of the knob operation part 200 to rotate along with turning of the knob operation part 200, the rotary unit 300 is rotated to a parking range through the gear part 400 coupled to a lower portion of the rotary unit 300 when ignition of a vehicle is turned off, and the body part 500 receives a locking part 510 coupled to the rotary unit 300 so as to restrict rotation of the rotary unit 300 and a sensing part 520 for sensing rotation of the rotary unit 300 and the gear part 400.

The cover part 100 is coupled to an upper side of the body part 500, and the display part 100 and the knob operation part 200 are inserted in the cover part 100. The cover part 100 includes an upper cover 120 configured such that the body part 500 is coupled to a lower end of the upper cover 120 and a covering 130 inserted in a lower portion of the upper cover 120 between the cover part 100 and the body part 500.

The display part 110 includes a shift range part 111 configured such that shift ranges are displayed as symbols such as P (parking), R (reverse), N (neutral), D (drive), and S (sport or manual) on an upper portion of the shift range part 111, a light source guide part 112 coupled to a lower side of the shift range part 111, and a light source part 113 coupled to a lower side of the light source guide part 112. The display part 110 irradiates the shift range part 111 with light through the light source part 113, thereby displaying a working shift range of the transmission.

The knob operation part 200 is inserted in the cover part 100 so as to be arranged on the side of the display part 100. The knob operation part 200 includes a knob cap 210, a knob ring 220 configured such that the knob cap 210 is inserted in an upper portion of the knob ring 220, and a knob 230 coupled with the knob cap 210 together with the knob ring 220. The knob 230 has protrusions surrounding an outer peripheral surface thereof such that the driver easily turns the knob 230. The knob operation part 200 is turned by a driver's operation, thereby enabling the shift range of the transmission to be adjusted.

The rotary unit 300 is coupled to the lower end of the knob operation part 200 to rotate along with the operation of the knob operation part 200 by the driver. The rotary unit 300 includes a shaft 310 inserted in the lower end of the knob operation part 200, a moving block 320 inserted in an upper side of the shaft 310, and a stopper 330 inserted in a lower side of the shaft 310. In addition, the rotary unit 300 includes a cam 340 fitted on an outer side of the shaft 310, a first elastic member 350 inserted in a lower end of the shaft 310, a slide pin 360 inserted in the shaft 310 so as to penetrate the shaft 310 in a direction perpendicular to the axial direction, and a sensing gear 370 engaged to an upper end of the moving block 320.

The shaft 310 has a polygonal column shape and is inserted in the knob operation part 200 such that a portion of one end of the shaft 310 inserted in the knob operation part 200 rotates along with the knob operation part 200. In addition, the shaft is inserted in the knob operation part 200 in such a manner that one end of the shaft 310 inserted in the knob operation part 200 penetrates the moving block 320. In addition, the shaft 310 includes a key 311 formed on an outer peripheral surface of the shaft 310 inserted in the moving block 320 so as to rotate the moving block 320 together.

The shaft 310 includes a through-hole 312 formed in the direction perpendicular to the axial direction beneath the key 311. Here, the slide pin 360 is inserted in the through-hole 312. In addition, the shaft 310 may be moved downward by a driver's pressing operation, and may be returned to a position before the driver presses the shaft 310 by the first elastic member 350 inserted in the lower end of the shaft 310.

The moving block 320 is fitted to the shaft 310. The moving block 320 has a groove in which the key formed on the outer peripheral surface of the shaft 310 is inserted, and may rotate along with rotation of the shaft 310 by engaging of the groove with the key. The moving block 320 has gear teeth which are formed on an upper side thereof and are engaged with the sensing gear 370, and has a protrusion part which is formed on a lower side thereof and is coupled to the locking part 510.

The stopper 330 is inserted in the lower side of the shaft 310 on the outer peripheral surface thereof. The stopper 330 has grooves formed in a two-stage manner on an upper side thereof so that the slide pin 360 is movably fitted in the grooves, and has gear teeth which are formed on a lower side thereof and are engaged with the gear part 400. Hereinafter, the stopper 330 will be described in more detail with reference to FIG. 5.

Figure 5:
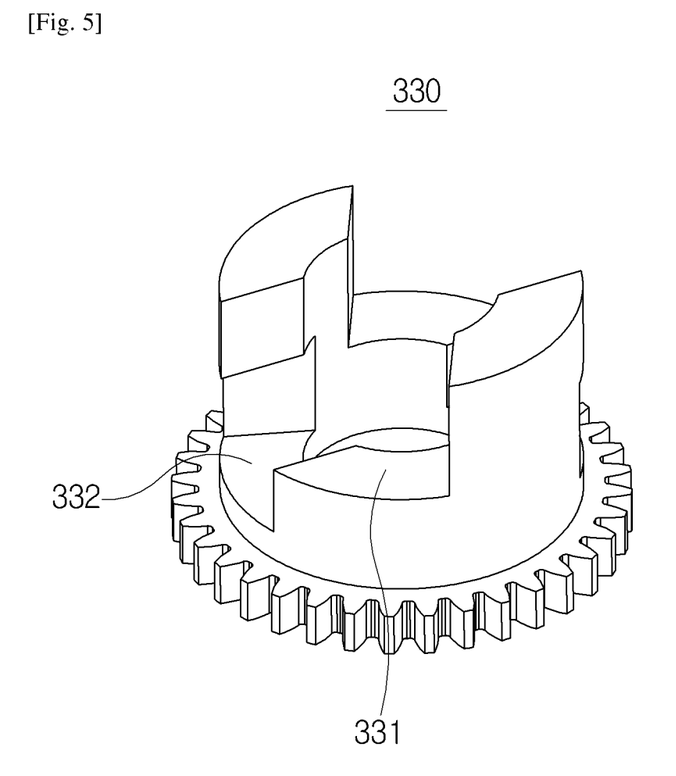
FIG. 5 is a perspective view illustrating a stopper of FIG. 1.

Referring to FIG. 5, the stopper 330 is configured such that the grooves formed in the two-stage manner on the upper side thereof extend in different directions from a center at which the grooves are vertically interconnected. That is, the stopper 330 is connected to the shaft such that the slide pin 360 is vertically movable on an upper groove 331 and a lower groove 332 and the upper groove 331 and the lower groove 332 extend in the different directions. Consequently, the slide pin 360 may be restricted from rotating in a clockwise direction or a counterclockwise direction due to catching of the slide pin 360 by the grooves when the shaft 310 is rotated.

In the stopper 330, the slide pin 360 is positioned at the upper groove 331 when the transmission is shifted to the P, R, N, or D range whereas the slide pin 360 is positioned at the lower groove 332 when the transmission is shifted to the S range.

Referring to FIGS. 1 to 4 again, the cam 340 is fitted to the shaft 310 so as to surround a portion of the stopper 330 and the slide pin 360. The cam 340 is arranged such that the slide pin 360 comes into frictional contact with an inner peripheral surface of the cam 340 and has detent grooves formed on the inner peripheral surface thereof, so as to provide an operation feeling through catching of the slide pin 360 by the detent grooves.

The first elastic member 350 is inserted in the lower end of the shaft 310 to axially provide elastic force to the shaft 310. That is, the first elastic member 350 provides the elastic force to the shaft 310 such that the shaft 310 pressed by the driver is returned to an original position. The first elastic member 350 may be formed in one of various compression springs such as a cylindrical spring, a double-headed type spring, a dapper type spring, and a pupa type spring.

The slide pin 360 is inserted in the through-hole 312 of the shaft 310, and a second elastic member 361 is coupled between both ends of the slide pin 360. The second elastic member 361 provides elastic force to both ends of the slide pin 360. Both ends of the slide pin 360 come into frictional contact with the inner peripheral surface of the cam 340 and are caught by the detent grooves formed on the inner peripheral surface of the cam 340. Here, the slide pin 360 is inserted in the through-hole 312 while moving between the detent grooves according to the rotation of the shaft 310, and protrudes outward by the elastic force of the second elastic member 361 to be caught by the detent grooves. In this case, an operation feeling is provided for the driver through the catching of the slide pin 360 and the cam 340.

The sensing gear 370 has gear teeth which are formed on an upper end thereof and are engaged with the moving block 320. A first magnetic substance 371 is coupled to a lower end of the sensing gear 370. A rotation angle of the sensing gear 370 is sensed by a first sensor 522 coupled to the body part 50 in the vicinity of the first magnetic substance 371. When the knob operation part 200 is turned by the operation of the driver, the sensing gear 370 rotates along with rotation of the moving block 320. In this case, the first magnetic substance 371 rotates along with the sensing gear 370 and rotation of the first magnetic substance 371 is sensed by the first sensor 522, thereby allowing the rotation angle of the sensing gear 370 to be sensed.

The gear part 400 is coupled to the lower portion of the rotary unit 300 to rotate the rotary unit 300 to a parking range position when the ignition of the vehicle is turned off. The gear part 400 includes a first gear 410 engaged to a lower end of the stopper 330, a second gear engaged with the first gear 410, and a motor 440 engaged to the second gear 420 through a worm gear 430.

The gear part 400 includes a second magnetic substance 450 coupled to a lower portion of the second gear 420, and a rotation angle of the second gear 420 is sensed by a second sensor 523 coupled to the body part 50 in the vicinity of the second magnetic substance 450. The gear part 400 rotates the stopper 330 through the first and second gears 410 and 420 according to the rotation angle of the sensing gear 370 sensed by the first sensor 522 by driving the motor 440 when the ignition of the vehicle is turned off, thereby rotating the rotary unit 300 to the parking range position.

The body part 500 includes a locking part 510 coupled to the rotary unit 300 to restrict the rotation of the rotary unit 300, a sensing part 520 for sensing the rotation of the rotary unit 300 and the gear part 400, a body 530 receiving the locking part 510 and the sensing part 520, and a lower cover 540 coupled to the lower end of the body 530 to seal the body 530. The body part 500 includes a middle cover 550 coupled to an upper side thereof, and the middle cover 550 is coupled to the upper side of the body part 500 between the body part 500 and the cover part 100. The middle cover 550 has a seating part 551 in which the knob operation part 200 is inserted.

The middle cover 550 further includes an outlet port 552 which is formed at one side thereof so as to be inclined outwardly and downwardly from the inside of the seating part 551. The outlet port 552 is formed such that foreign substances introduced through the side of the knob operation part 200 are discharged to the outside without flowing into the body part 500.

The locking part 510 includes a stationary block 511 having a groove part 511a so as to be coupled to the lower end of the moving block 320, a solenoid 512 coupled to one side of the stationary block 511 so as to move the stationary block 511 in a forward or backward direction, and a guide block 513 arranged so as to support a side of the stationary block 511.

The stationary block 511 may restrict the rotation of the moving block 320 by fitting the protrusion part formed on the lower end of the moving block 320 into the groove part 511a. The solenoid 512 is operated according to vehicle speed and brake signals when the stationary block 511 is moved, and thus the moving block 320 is rotated or not rotated, thereby enabling the transmission to be shifted or not shifted.

One side of the stationary block 511 coupled to the solenoid 512 extends downward to be arranged between a light source and an optical sensor 524. Consequently, movement of the stationary block 511 may be sensed in such a manner that a gap between the light source and the optical sensor 524 is closed or opened through the movement of the stationary block 511 by the solenoid 512.

The sensing part 520 includes a substrate 521 arranged beneath the gear part 400, first and second sensors 522 and 523 coupled to the substrate 521, a light source, and an optical sensor 524. The first sensor 522 is arranged in the vicinity of the first magnetic substance 371 to sense a rotation angle of the first magnetic substance 371 rotated along with the sensing gear 370, and the second sensor 523 is arranged in the vicinity of the second magnetic substance 450 to sense a rotation angle of the second gear 420 rotated by the motor 440.

Figure 6:
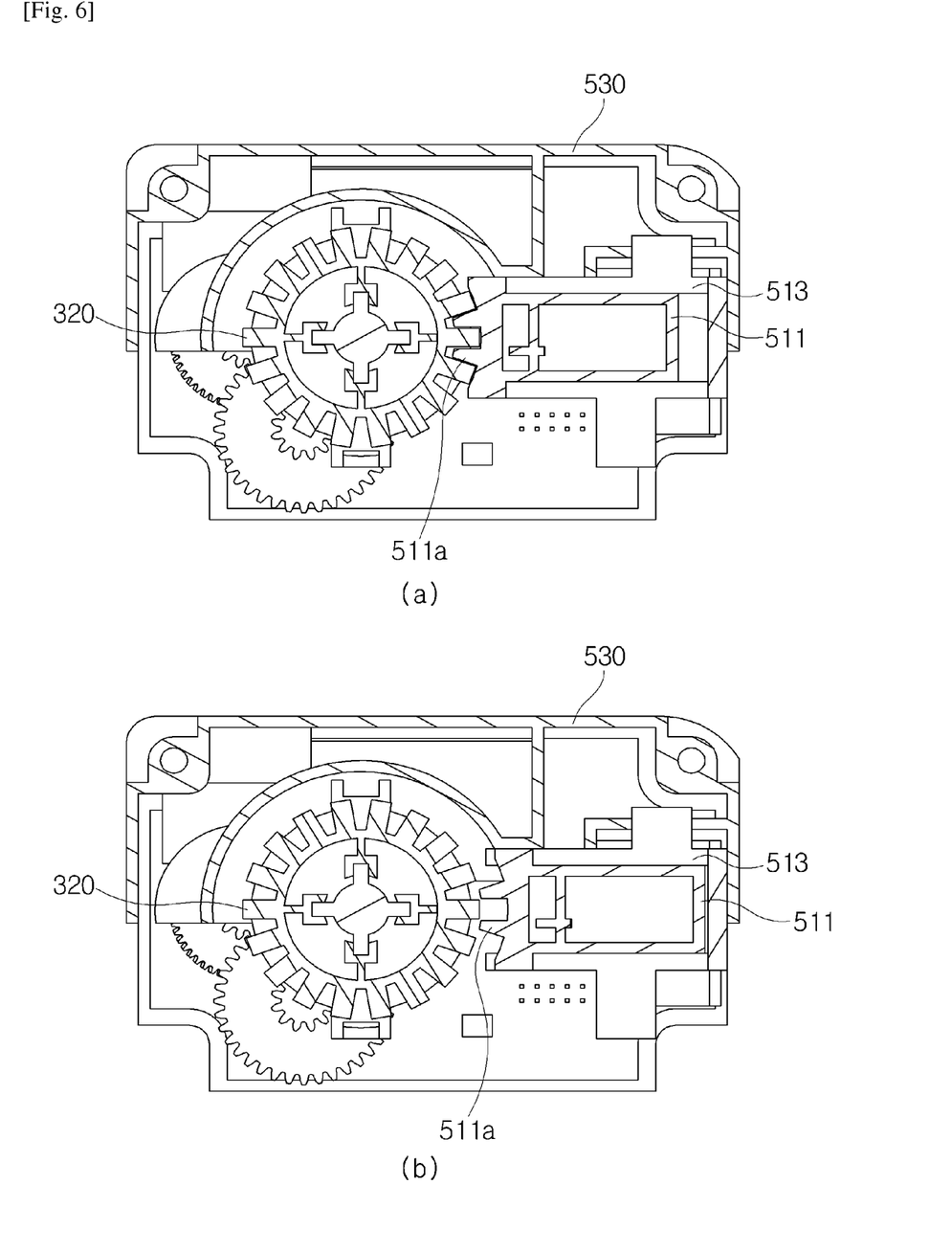
FIG. 6 is a cross-sectional view taken along line "B-B" of FIG. 4 for illustrating a state in which a locking part is locked or unlocked.

FIG. 6 is a cross-sectional view taken along line "B-B" of FIG. 4 for illustrating a state in which the locking part is locked or unlocked.

Referring to FIG. 6, the locked state of the locking part 510 is a state in which the protrusion part of the moving block 320 is inserted in the groove part 511a of the stationary block 511 (FIG. 6(a)), and the unlocked state of the locking part 510 is a state in which the protrusion part of the moving block 320 is decoupled from the groove part 511a of the stationary block 511 (FIG. 6(b)). The locked or unlocked state of the locking part 510 is realized in such a manner that the solenoid 512 is turned on or off according to vehicle speed and brake signals.

The solenoid 512 moves the stationary block 511 in the forward or backward direction, and thus the protrusion part of the moving block 320 is fitted into the groove part 511a. In this case, the guide block 513 supports the side of the stationary block 511 such that the stationary block 511 is not erroneously moved.

Here, the locking part 510 restricts the rotation of the moving block 320 according to the vehicle speed and the brake signals so as to prevent the transmission to be shifted when a brake is operated, thereby preventing damage of the transmission. In addition, locking part 510 restricts the transmission from being shifted according to the vehicle speed when the vehicle is moved forward or backward, thereby preventing the transmission to be shifted to a range in a reverse direction and preventing damage of the transmission.

Figure 7:
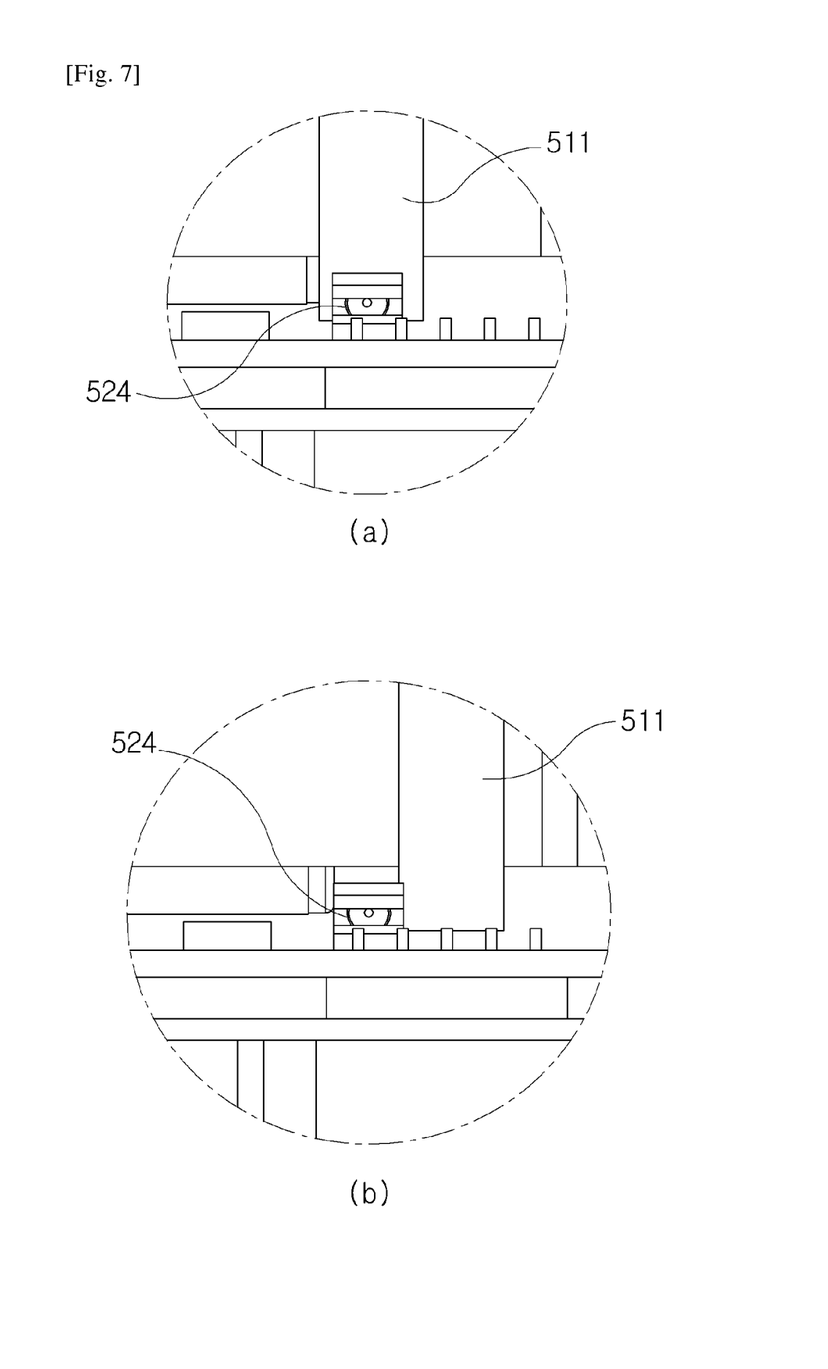
FIG. 7 is an enlarged view of portion "C" of FIG. 4 for illustrating a state in which it is sensed that a solenoid is turned on or off.

FIG. 7 is an enlarged view of portion "C" of FIG. 4 for illustrating a state in which it is sensed that the solenoid is turned on or off.

Referring to FIG. 7, the state in which the solenoid 512 is turned on or off is sensed through the light source and the optical sensor 524 installed on the substrate 521 in the vicinity of the lower portion of the stationary block 511. The lower portion of the stationary block 511 is arranged between the light source and the optical sensor 524, and closes or opens the gap between the light source and the optical sensor 524 while moving by the operation of the solenoid 512. Thus, the light source and the optical sensor 524 may sense whether or not the solenoid 512 is operated according to a state in which light of the light source is sensed.

Figure 8:
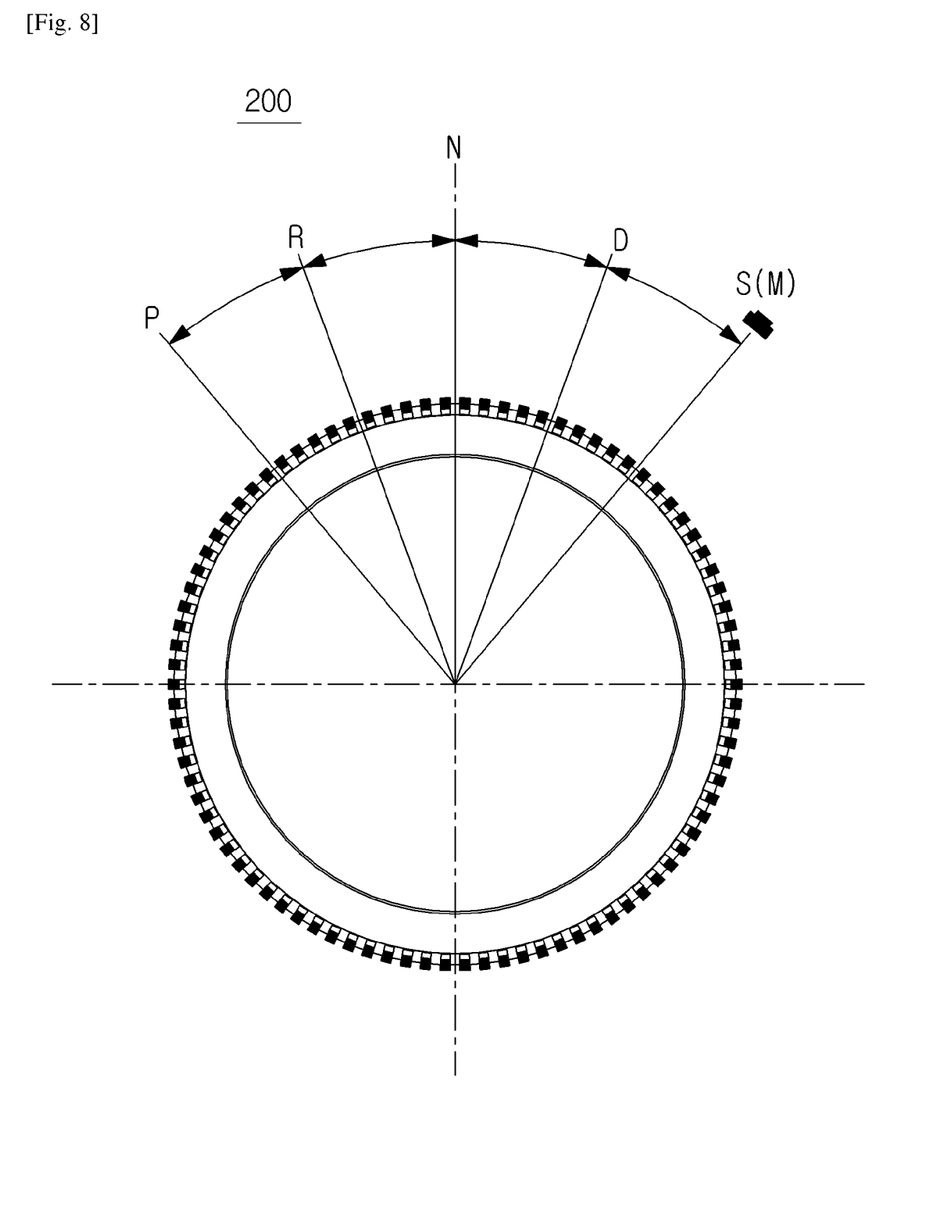
FIG. 8 is a view illustrating an operation state of a knob operation part according to a shift range in the shift range switching device for a vehicle of FIG. 1.
Figure 9:
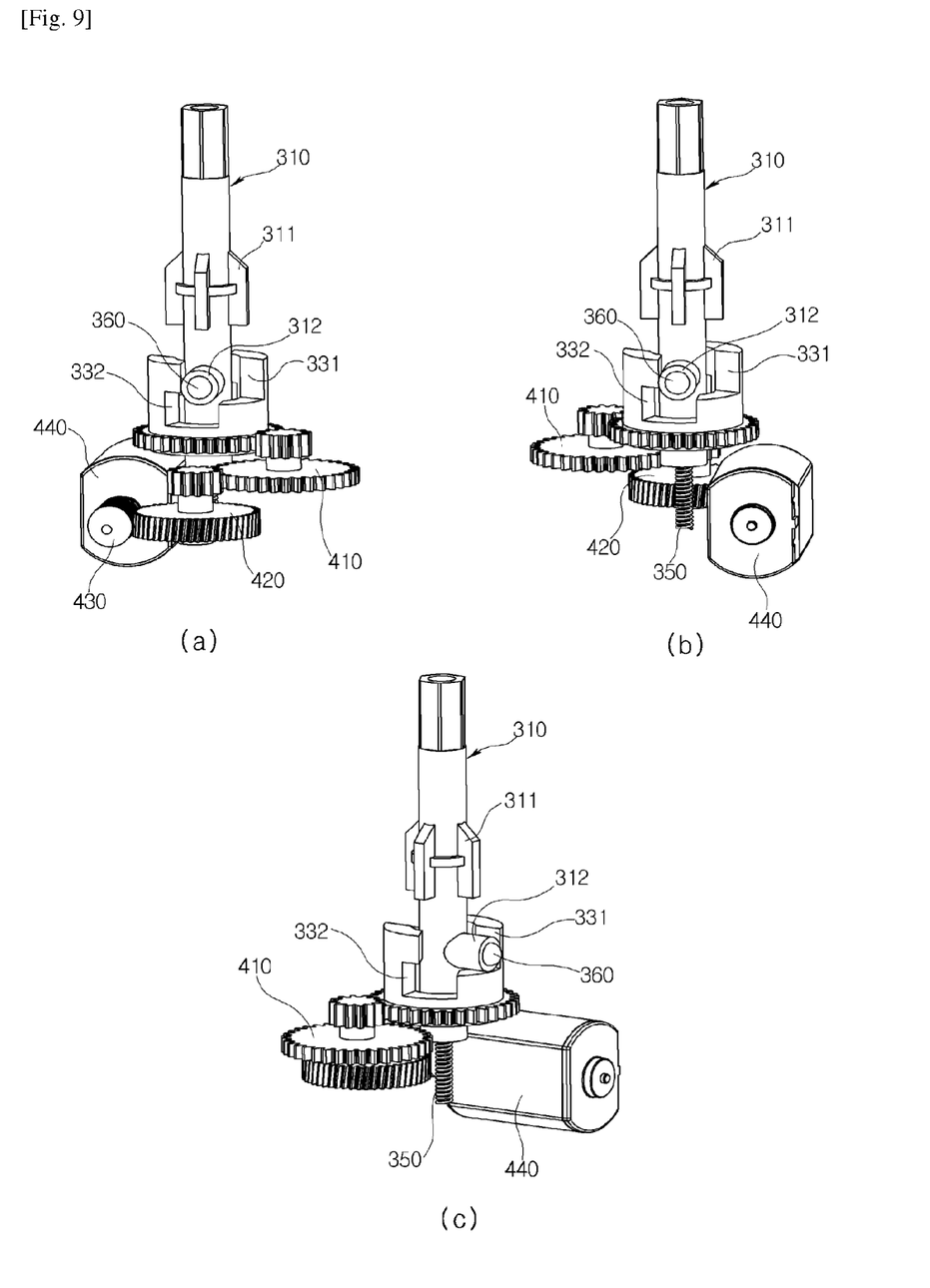
FIG. 9 is a perspective view illustrating a state of a slide pin and a stopper according to the shift range in the shift range switching device for a vehicle of FIG. 1.

FIG. 8 is a view illustrating an operation state of the knob operation part according to a shift range in the shift range switching device for a vehicle of FIG. 1. FIG. 9 is a perspective view illustrating a state of the slide pin and the stopper according to the shift range in the shift range switching device for a vehicle of FIG. 1.

Referring to FIGS. 8 and 9, the transmission may be shifted to each shift range when the knob operation part 200 is turned at a regular interval. Here, when the transmission is shifted to the D range through the operation of the knob operation part 200 by the driver, the rotary unit 300 is restricted from rotating in the clockwise direction of the shaft 310 due to catching of the slide pin 360 by one end of the upper groove 331 (FIGS. 9(a) and (b)). In this case, the transmission may be shifted to the S (M) range in such a manner that the driver presses the knob operation part 200 such that the slide pin 360 is moved from the upper groove 331 to the lower groove 332 and then turns the knob operation part 200.

In addition, the rotary unit 300 is restricted from rotating in the counterclockwise direction due to catching of the slide pin 360 by the other end of the upper groove 331 in the P range, and the pressing operation is restricted by a lower catching hook (FIG. 9(c)). The rotary unit 300 rotates the stopper 330 by driving the motor 440 when the ignition of the vehicle is turned off in the shift range (R, N, D, or S) other than the P range, so that the transmission is adjusted to the P range. The operation of the rotary unit 300 may prevent the vehicle from moving abruptly when the vehicle is restarted after the ignition thereof is turned off in the shift range other than the P range since the restarting of the vehicle is performed together with the shifting of the transmission. Hereinafter, the state of the slide pin 360 and the stopper 330 according to the shift range will be described in more detail with reference to FIG. 10.

Figure 10:
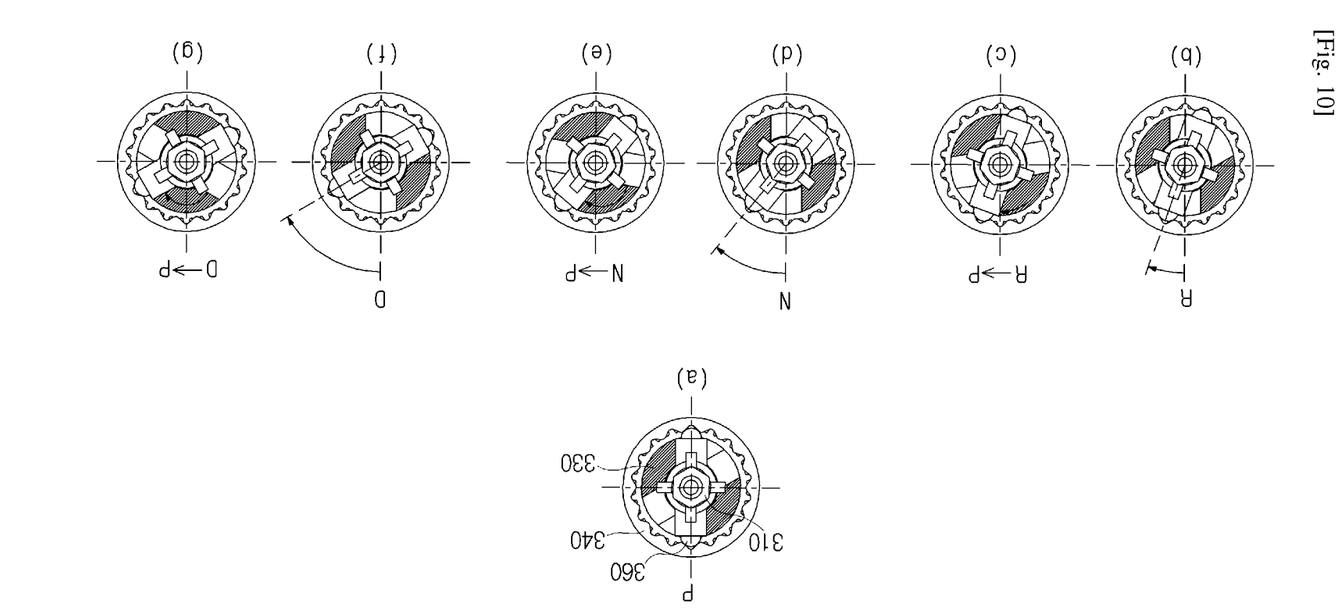
FIG. 10 is top view illustrating the state of the slide pin and the stopper according to the shift range in the shift range switching device for a vehicle of FIG. 9.

FIG. 10 is top view illustrating the state of the slide pin and the stopper according to the shift range in the shift range switching device for a vehicle of FIG. 9.

Referring to FIG. 10, the shift range switching device for a vehicle 10 is restricted from rotating in the counterclockwise direction due to catching of the slide pin 360 by the stopper 330 in the P range (FIG. 10(a)). Here, when the shaft 310 is rotated by a certain radius in the clockwise direction through the operation of the knob operation part 200 by the driver, the transmission is shifted to the R range (FIG. 10(b)). In this case, when the ignition of the vehicle is turned off, the motor 440 is driven and the stopper 330 comes into contact with the slide pin 360 by rotating in the clockwise direction, thereby allowing the switching device 10 to be moved to the P range position at which the shaft 310 is restricted from rotating in the counterclockwise direction (FIG. 10(c)).

In the state of FIG. 10(a), when the shaft 310 is rotated by a certain radius in the clockwise direction through the operation of the knob operation part 200 by the driver, the transmission is shifted to the N range (FIG. 10(d)). In this case, when the ignition of the vehicle is turned off, the motor 440 is driven and the stopper 330 comes into contact with the slide pin 360 by rotating in the clockwise direction, thereby allowing the switching device 10 to be moved to the P range position at which the shaft 310 is restricted from rotating in the counterclockwise direction (FIG. 10(e)).

In the state of FIG. 10(a), when the shaft 310 is rotated by a certain radius in the clockwise direction through the operation of the knob operation part 200 by the driver, the transmission is shifted to the D range (FIG. 10(f)). In this case, when the ignition of the vehicle is turned off, the motor 440 is driven and the stopper 330 comes into contact with the slide pin 360 by rotating in the clockwise direction, thereby allowing the switching device 10 to be moved to the P range position at which the shaft 310 is restricted from rotating in the counterclockwise direction (FIG. 10(g)).

The stopper 330 moves the shift range switching device for a vehicle 10 to the P range position by automatically rotating according to the driving of the motor 440 when the ignition of the vehicle is turned off. Accordingly, the shift range switching device for a vehicle 10 may prevent the vehicle from moving abruptly even when the vehicle is restarted after the ignition thereof is turned off in the shift range other than the P range since the restarting of the vehicle is performed and at the same time the transmission is not shifted to the shift range when the ignition is turned off.

Various embodiments have been described in the best mode for carrying out the invention. Although the present invention has been described with respect to the illustrative embodiments, it will be apparent to those skilled in the art that various variations and modifications may be made without departing from the spirit and scope of the invention as defined in the following claims.

The invention claimed is:

1. A shift range switching device for a vehicle, comprising:
   a cover part configured such that a display part for displaying a working range of a transmission is inserted in one side of the cover part;
   a knob operation part inserted in the cover part so as to be arranged on a side of the display part;
   a rotary unit rotatable to select at least one of a reverse range, a neutral range, a drive range, a sport range, and a manual range, the rotary unit comprising a shaft inserted in a lower end of the knob operation part, a moving block connected to an upper side of the shaft, and a stopper connected to a lower side of the shaft, the rotary unit rotating along with the knob operation part;
   a gear part coupled to a lower portion of the rotary unit to rotate the rotary unit from the at least one of the reverse range, the neutral range, the drive range, the sport range, and the manual range to a parking range;
   a body part comprising a locking part coupled to the rotary unit to restrict rotation of the rotary unit, a sensing part for sensing rotation of the rotary unit and the gear part, and a body receiving the locking part and the sensing part; and
   wherein the rotary unit comprises a cam fitted on an outer side of the shaft, a first elastic member inserted in a lower end of the shaft, a slide pin inserted in the shaft so as to penetrate the shaft in a direction perpendicular to the axial direction thereof, and a sensing gear engaged to an upper end of the moving block.

2. The shift range switching device according to claim 1, wherein the cam is arranged so as to surround a portion of the stopper and the slide pin.

3. The shift range switching device according to claim 1, wherein the slide pin has a second elastic member coupled between both ends thereof, and the second elastic member provides elastic force to the both ends of the slide pin.

4. The shift range switching device according to claim 3, wherein the both ends of the slide pin come into frictional contact with an inner peripheral surface of the cam and a detent groove is formed on the inner peripheral surface of the cam, so that the slide pin is caught by the detent groove by the elastic force of the second elastic member.

5. The shift range switching device according to claim 1, wherein the shaft comprises a key formed on an outer peripheral surface thereof to be inserted in the moving block, and a through-hole formed beneath the key in the direction perpendicular to the axial direction.

6. The shift range switching device according to claim 5, wherein the slide pin is inserted in the through-hole.

7. The shift range switching device according to claim 1, wherein the stopper has grooves formed in a two-stage manner on an upper end thereof so that the slide pin is caught by the grooves.

8. The shift range switching device according to claim 7, wherein the grooves of the stopper formed in the two-stage manner extend in different directions from a center at which the grooves are vertically interconnected, the slide pin is positioned at an upper groove of the grooves when the transmission is shifted to the parking range, the reverse range, the neutral range, or the drive range, and the slide pin is positioned at a lower groove of the grooves when the transmission is shifted to the sport range or the manual range.

9. The shift range switching device according to claim 1, wherein the sensing gear has gear teeth which are formed on an upper end thereof and are engaged with the moving block, and a first magnetic substance coupled to a lower end thereof.

10. The shift range switching device according to claim 9, wherein the body sensing part comprises a first sensor arranged in the vicinity of the first magnetic substance to sense rotation of the sensing gear.

11. The shift range switching device according to claim 10, wherein the gear part comprises a first gear engaged to a lower end of the stopper, a second gear engaged with the first gear, and a motor engaged to the second gear through a worm gear.

12. The shift range switching device according to claim 11, wherein the gear part comprises a second magnetic substance coupled to a lower portion of the second gear, and the sensing part comprises a second sensor arranged in the vicinity of the second magnetic substance to sense rotation of the second gear.

13. The shift range switching device according to claim 1, wherein a middle cover is coupled between the body part and the cover part in an upper portion of the body part, and the middle cover has a seating part in which the knob operation part is inserted.

14. The shift range switching device according to claim 13, wherein the middle cover further comprises an outlet port formed at one side of the seating part so as to be inclined outwardly and downwardly from the inside of the seating part.

15. The shift range switching device according to claim 1, wherein the locking part comprises a stationary block having a groove part coupled to a lower end of the moving block, a solenoid coupled to one side of the stationary block so as to move the stationary block in a forward or backward direction, and a guide block arranged so as to support a side of the stationary block.

16. The shift range switching device according to claim 15, wherein the moving block has a protrusion part formed on the lower end thereof to be inserted in the groove part of the stationary block.

* * * * *